United States Patent
Lowder

(10) Patent No.: US 10,011,380 B2
(45) Date of Patent: Jul. 3, 2018

(54) RUCKERS, RERUCKERS, DERUCKERS AND/OR SKIN BRAKES WITH STACKED GRIPPER LAYERS AND RELATED GRIPPERS

(71) Applicant: Tipper Tie, Inc., Apex, NC (US)

(72) Inventor: Matthew D. Lowder, Durham, NC (US)

(73) Assignee: Tipper Tie, Inc., Apex, NC (US)

( * ) Notice: Subject to any disclaimer, the term of this patent is extended or adjusted under 35 U.S.C. 154(b) by 805 days.

(21) Appl. No.: 14/460,720

(22) Filed: Aug. 15, 2014

(65) Prior Publication Data

US 2015/0052849 A1 Feb. 26, 2015

Related U.S. Application Data

(60) Provisional application No. 61/869,828, filed on Aug. 26, 2013.

(51) Int. Cl.

| | | |
|---|---|---|
| *B65B 43/46* | (2006.01) | |
| *A22C 13/02* | (2006.01) | |
| *B65B 9/15* | (2006.01) | |
| *A22C 11/00* | (2006.01) | |
| *B65B 51/04* | (2006.01) | |

(52) U.S. Cl.
CPC ............ *B65B 43/46* (2013.01); *A22C 11/005* (2013.01); *A22C 13/02* (2013.01); *B65B 9/15* (2013.01); *B65B 51/04* (2013.01)

(58) Field of Classification Search
CPC ......... B65B 51/04; B65B 9/15; B65B 63/026; B65B 51/043; A22C 11/005; A22C 13/02

USPC ................................................. 53/389.2, 436
See application file for complete search history.

(56) References Cited

U.S. PATENT DOCUMENTS

| | | | |
|---|---|---|---|
| 1,069,253 | A | 8/1913 | Henebergh |
| 1,450,104 | A | 3/1923 | Merli et al. |
| 1,611,268 | A | 12/1926 | Colby |
| (Continued) | | | |

FOREIGN PATENT DOCUMENTS

| | | |
|---|---|---|
| DE | 2452760 | 5/1976 |
| DE | 4020391 | 1/1992 |
| (Continued) | | |

OTHER PUBLICATIONS

International Search Report and Written Opinion for PCT Application No. PCT/US2006/028204, dated Aug. 3, 2007, 9 pages.

(Continued)

*Primary Examiner* — Robert Long
*Assistant Examiner* — Xavier A Madison
(74) *Attorney, Agent, or Firm* — Christensen O'Connor Johnson Kindness PLLC

(57) ABSTRACT

Methods, apparatus and associated devices for one or more of rucking, derucking, braking or rerucking sleeves of covering material off of and/or onto a chute body include a gripper with a stacked set of discrete gripper layers with forward facing protrusions. The grippers can have an automated stroke cycle whereby cooperating pairs of gripper assemblies can be configured to travel inwardly a distance sufficient to snugly abut an outer surface of a chute body and remain in contact with the chute body while traveling in a longitudinal and/or axial direction to contact covering and pull the covering along the chute body.

20 Claims, 11 Drawing Sheets

(56) References Cited

U.S. PATENT DOCUMENTS

| | | |
|---|---|---|
| 1,913,828 A | 6/1933 | Brennan |
| 2,198,913 A | 4/1940 | Grounds et al. |
| 2,413,522 A | 12/1946 | Russell |
| 1,165,223 A | 12/1951 | Butz |
| 2,622,778 A | 12/1952 | Poland |
| 2,712,824 A | 7/1955 | Steiner |
| 2,713,449 A | 7/1955 | Carmichael |
| 2,720,055 A | 10/1955 | Morris |
| 2,737,108 A | 3/1956 | Galick |
| 2,812,628 A | 11/1957 | Russel et al. |
| 2,859,574 A | 11/1958 | Olivette |
| 2,880,419 A | 4/1959 | Tipper |
| 2,885,850 A | 5/1959 | Smith |
| 2,933,037 A | 4/1960 | Russell |
| 2,946,166 A | 7/1960 | Baxter |
| 2,977,732 A | 4/1961 | Leonard et al. |
| 3,065,586 A | 11/1962 | Ghiringhelli |
| 3,197,938 A | 8/1965 | Lasoff |
| 3,211,193 A | 10/1965 | Anderson |
| 3,214,883 A | 11/1965 | Omori |
| 3,290,841 A | 12/1966 | Sartore |
| 3,342,017 A | 9/1967 | Yerkey |
| 3,344,467 A | 10/1967 | Barbu |
| 3,358,418 A | 12/1967 | Manetta |
| 3,379,123 A | 4/1968 | Weltner |
| 3,383,228 A | 5/1968 | Rekate |
| 3,383,754 A | 5/1968 | Klenz |
| 3,384,007 A | 5/1968 | Boje et al. |
| 3,389,533 A | 6/1968 | Tipper et al. |
| 3,400,433 A | 9/1968 | Klenz |
| 3,499,259 A | 3/1970 | Tipper et al. |
| 3,521,675 A | 7/1970 | Dussich |
| 3,543,378 A | 12/1970 | Klenz |
| 3,553,924 A | 1/1971 | Bonami |
| 3,555,775 A | 1/1971 | McMillan |
| 3,580,166 A | 5/1971 | Longo |
| 3,587,204 A | 6/1971 | George |
| 3,593,484 A | 7/1971 | Dussich |
| 3,621,775 A | 11/1971 | Dedio et al. |
| 3,624,982 A | 12/1971 | Marietta, Jr. |
| 3,643,401 A | 2/1972 | Wickersheim |
| 3,662,514 A | 5/1972 | Goss |
| 3,687,063 A | 8/1972 | Clar |
| 3,719,022 A | 3/1973 | Cherio |
| 3,732,113 A | 5/1973 | Walters |
| 3,732,662 A | 5/1973 | Paxton |
| 3,745,610 A | 7/1973 | Urbutis |
| 3,745,868 A | 7/1973 | Prentice |
| 3,748,717 A | 7/1973 | Leffler et al. |
| 3,763,621 A | 10/1973 | Klein et al. |
| 3,763,769 A | 10/1973 | Bysouth et al. |
| 3,793,688 A | 2/1974 | Keating et al. |
| 3,795,085 A | 3/1974 | Andre et al. |
| 3,797,199 A | 3/1974 | Seifert |
| 3,802,337 A | 4/1974 | Hiliare |
| 3,805,480 A | 4/1974 | Cherio et al. |
| 3,807,130 A | 4/1974 | Pedersen |
| 3,815,323 A | 6/1974 | Longo |
| 3,815,649 A | 6/1974 | Delmar |
| 3,827,210 A | 8/1974 | Smalley et al. |
| 3,827,213 A | 8/1974 | Matzinger |
| 3,838,551 A | 10/1974 | Arikawa et al. |
| 3,848,397 A | 11/1974 | Allen |
| 3,863,779 A | 2/1975 | Stockman |
| 3,872,785 A | 3/1975 | Elliott |
| 3,877,589 A | 4/1975 | Stockman |
| 3,903,790 A | 9/1975 | Gladwin |
| 3,938,300 A | 2/1976 | Lovqvist |
| 3,940,906 A | 3/1976 | Leckband et al. |
| 3,945,171 A | 3/1976 | Marietta, Jr. et al. |
| 3,971,191 A | 7/1976 | Hoyland |
| 3,975,795 A | 8/1976 | Kupcikevicius et al. |
| D243,158 S | 1/1977 | Bolwell |
| 4,001,926 A | 1/1977 | Velarde |
| 4,018,031 A | 1/1977 | Smaw |
| 4,023,238 A | 5/1977 | Phares |
| RE29,278 E | 6/1977 | Vogel |
| 4,028,775 A | 6/1977 | Tysver |
| 4,036,124 A | 7/1977 | Seiler et al. |
| 4,044,425 A | 8/1977 | Nausedas |
| 4,044,426 A | 8/1977 | Kupcikevicius et al. |
| 4,044,450 A | 8/1977 | Raudys et al. |
| 4,074,389 A | 2/1978 | Blair et al. |
| 4,091,595 A | 5/1978 | Pelster et al. |
| 4,096,799 A | 6/1978 | Zupancic |
| 4,098,180 A | 7/1978 | Tea et al. |
| 4,107,903 A | 8/1978 | Wickerheim |
| 4,109,363 A | 8/1978 | Velarde |
| 4,133,164 A | 1/1979 | Mintz |
| 4,147,012 A | 4/1979 | van Mil |
| 4,152,035 A | 5/1979 | Fox |
| 4,155,212 A | 5/1979 | Marchese |
| 4,157,003 A | 6/1979 | Kamphaus |
| 4,165,593 A | 8/1979 | Niedecker |
| 4,175,690 A | 11/1979 | Bova et al. |
| 4,183,192 A | 1/1980 | Lucke |
| 4,203,269 A | 5/1980 | Petersen |
| 4,211,051 A | 7/1980 | Tucker |
| 4,213,387 A | 7/1980 | McCaney et al. |
| RE30,390 E | 9/1980 | Kupcikevicius et al. |
| 4,218,861 A | 9/1980 | Marz |
| 4,223,508 A | 9/1980 | Wells |
| 4,223,511 A | 9/1980 | Black |
| 4,247,005 A | 1/1981 | Buxton |
| 4,261,399 A | 4/1981 | Hawkins et al. |
| 4,269,115 A | 5/1981 | Gattyan |
| 4,352,263 A | 10/1982 | Andrews |
| 4,377,929 A | 3/1983 | Altenpohl et al. |
| 4,430,772 A | 2/1984 | Michel et al. |
| 4,432,188 A | 2/1984 | Andrews |
| 4,464,882 A | 8/1984 | Van Ginkel et al. |
| 4,494,364 A | 1/1985 | Meyn |
| 4,505,003 A | 3/1985 | Becker et al. |
| 4,516,387 A | 5/1985 | Kupcikevicius |
| 4,525,898 A | 7/1985 | Gallion et al. |
| 4,537,006 A | 8/1985 | Pieri |
| 4,557,018 A | 12/1985 | Martinek |
| 4,563,792 A | 1/1986 | Niedecker |
| 4,570,301 A | 2/1986 | Beckman et al. |
| 4,577,370 A | 3/1986 | Kollross |
| 4,580,316 A | 4/1986 | Gunter |
| 4,590,748 A | 5/1986 | Harrison et al. |
| 4,590,749 A | 5/1986 | Temple et al. |
| 4,599,764 A | 7/1986 | Knepshield |
| 4,599,941 A | 7/1986 | Johnson et al. |
| 4,649,601 A | 3/1987 | Kollross |
| 4,651,498 A | 3/1987 | Piereder |
| 4,675,945 A | 6/1987 | Evans et al. |
| 4,683,700 A | 8/1987 | Evans et al. |
| 4,703,611 A | 11/1987 | Young |
| 4,709,450 A | 12/1987 | Stanley et al. |
| 4,750,239 A | 6/1988 | Niedecker |
| 4,766,713 A | 8/1988 | Evans |
| 4,771,510 A | 9/1988 | Kawai |
| 4,773,128 A | 9/1988 | Stanley et al. |
| 4,809,484 A | 3/1989 | Lovik |
| 4,847,953 A | 7/1989 | Evans et al. |
| 4,885,821 A | 12/1989 | Farkonas |
| 4,924,552 A | 5/1990 | Sullivan |
| 4,939,891 A | 7/1990 | Podini |
| 4,944,172 A | 7/1990 | Evans |
| 4,951,452 A | 8/1990 | Lundahl et al. |
| 4,958,477 A | 9/1990 | Winkler |
| 4,969,233 A | 11/1990 | Stanley |
| 5,016,424 A | 5/1991 | Stirling |
| 5,017,175 A | 5/1991 | Klusmire |
| 5,024,041 A | 6/1991 | Urban et al. |
| 5,042,234 A | 8/1991 | Evans et al. |
| 5,044,144 A | 9/1991 | Foote et al. |
| 5,045,020 A | 9/1991 | Neeff et al. |
| 5,056,293 A | 10/1991 | Richards et al. |
| 5,067,313 A | 11/1991 | Evans |
| 5,074,386 A | 12/1991 | Evans |
| 5,077,955 A | 1/1992 | Evans |

(56) References Cited

U.S. PATENT DOCUMENTS

| | | | |
|---|---|---|---|
| 5,078,059 A | 1/1992 | Recker | |
| 5,085,036 A | 2/1992 | Evans et al. | |
| 5,101,719 A | 4/1992 | Recker | |
| 5,107,666 A | 4/1992 | Rahtican | |
| 5,109,648 A | 5/1992 | Evans | |
| 5,135,770 A | 8/1992 | Underwood | |
| 5,161,347 A | 11/1992 | May et al. | |
| 5,165,216 A | 11/1992 | May et al. | |
| 5,167,567 A | 12/1992 | Evans | |
| 5,181,302 A | 1/1993 | Evans | |
| 5,195,303 A | 3/1993 | Tomanovits | |
| 5,203,760 A | 4/1993 | Chen et al. | |
| 5,209,041 A | 5/1993 | Evans | |
| 5,211,599 A | 5/1993 | Stanley | |
| D340,467 S | 10/1993 | Pollak et al. | |
| 5,269,054 A | 12/1993 | Poteat et al. | |
| 5,273,481 A | 12/1993 | Sullivan | |
| 5,277,745 A | 1/1994 | Williams | |
| 5,385,089 A | 1/1995 | Newsom | |
| 5,402,625 A | 4/1995 | Halstead | |
| 5,408,810 A | 4/1995 | Cullen | |
| 5,421,142 A | 6/1995 | Cullen | |
| 5,426,910 A | 6/1995 | Cullen | |
| 5,435,114 A | 7/1995 | Moehlenbrock et al. | |
| 5,451,084 A * | 9/1995 | Jansch | B25B 1/241 |
| | | | 166/77.53 |
| 5,468,179 A | 11/1995 | Stanley et al. | |
| 5,476,673 A | 12/1995 | Sombrio | |
| 5,483,784 A | 1/1996 | Owensby et al. | |
| 5,495,701 A | 3/1996 | Poteat et al. | |
| 5,514,029 A | 5/1996 | Schutz | |
| 5,540,143 A | 7/1996 | Stromer et al. | |
| 5,570,561 A | 11/1996 | May et al. | |
| 5,573,454 A | 11/1996 | Fox et al. | |
| 5,586,424 A | 12/1996 | Chen et al. | |
| 5,644,896 A | 7/1997 | Evans et al. | |
| 5,657,527 A | 8/1997 | Houck et al. | |
| 5,701,723 A | 12/1997 | Simpson | |
| 5,715,656 A | 2/1998 | Pearce | |
| 5,752,374 A | 5/1998 | Allworden et al. | |
| 5,755,022 A | 5/1998 | Whittlesey | |
| 5,782,056 A | 7/1998 | May et al. | |
| 5,782,067 A | 7/1998 | Fuss et al. | |
| 5,855,107 A | 1/1999 | Haffield | |
| 5,884,346 A | 3/1999 | Hengl | |
| 5,980,374 A | 11/1999 | Mercuri | |
| 6,052,972 A | 4/2000 | Rea et al. | |
| 6,131,367 A | 10/2000 | Fukuda et al. | |
| 6,216,425 B1 | 4/2001 | Hanten | |
| 6,302,027 B1 | 10/2001 | Compton et al. | |
| 6,401,885 B1 | 6/2002 | Whittlesey | |
| 6,439,990 B1 | 8/2002 | Kasai et al. | |
| 6,537,406 B1 | 3/2003 | Jensen et al. | |
| 6,588,173 B1 | 7/2003 | Moore et al. | |
| 6,604,338 B1 | 8/2003 | May et al. | |
| 6,637,075 B1 | 10/2003 | Gorman et al. | |
| 6,666,759 B2 | 12/2003 | Narcuso | |
| 6,669,545 B1 | 12/2003 | Hergott et al. | |
| 6,694,711 B1 | 2/2004 | Cullen | |
| 6,695,364 B2 | 2/2004 | Bierlin | |
| 6,708,742 B2 | 3/2004 | Weathers et al. | |
| 6,719,194 B2 | 4/2004 | Richards | |
| 6,729,102 B2 | 5/2004 | Ailey et al. | |
| 6,739,370 B2 | 5/2004 | Melheim | |
| 6,745,547 B2 | 6/2004 | Bussey et al. | |
| 6,883,297 B2 | 4/2005 | Kirk et al. | |
| 6,932,688 B2 | 8/2005 | Stanley et al. | |
| 6,945,171 B1 | 9/2005 | Coull | |
| 6,971,283 B2 * | 12/2005 | Belik | B25B 5/147 |
| | | | 81/186 |
| 6,976,346 B2 | 12/2005 | May et al. | |
| 7,021,026 B2 | 4/2006 | Griggs et al. | |
| 7,051,415 B2 | 5/2006 | Pinto et al. | |
| 7,063,610 B2 | 6/2006 | Mysker | |
| 7,140,288 B2 | 11/2006 | Twerdok | |
| 7,143,566 B2 | 12/2006 | May et al. | |
| 7,222,469 B2 | 5/2007 | Griggs | |
| 7,231,984 B2 * | 6/2007 | Jaensch | B25B 13/5016 |
| | | | 166/380 |
| 7,234,287 B2 | 6/2007 | Griggs et al. | |
| 7,237,369 B2 | 7/2007 | Griggs | |
| 7,306,511 B2 | 12/2007 | Whittlesey | |
| 7,313,896 B2 | 1/2008 | Griggs et al. | |
| 7,322,163 B2 | 1/2008 | Griggs | |
| 7,356,977 B2 | 4/2008 | Griggs et al. | |
| 7,386,966 B2 | 6/2008 | Griggs et al. | |
| 7,404,758 B2 | 7/2008 | Mysker | |
| 7,430,839 B2 | 10/2008 | Griggs | |
| 7,441,386 B2 | 10/2008 | Pinto et al. | |
| 7,441,389 B2 | 10/2008 | Scholtis et al. | |
| 7,478,515 B2 | 1/2009 | Griggs et al. | |
| 7,488,243 B2 | 2/2009 | Wince et al. | |
| 7,507,150 B2 | 3/2009 | Stall et al. | |
| 7,526,905 B2 | 5/2009 | Griggs et al. | |
| 7,536,838 B2 | 5/2009 | Whittlesey et al. | |
| 7,537,514 B2 | 5/2009 | Lopez | |
| 7,604,531 B2 | 10/2009 | Hanten | |
| 7,641,542 B2 | 1/2010 | Haschke et al. | |
| 7,647,749 B2 | 1/2010 | Pinto et al. | |
| 7,665,278 B2 | 2/2010 | Griggs et al. | |
| 7,704,129 B2 | 4/2010 | May et al. | |
| 7,739,855 B2 | 6/2010 | Griggs et al. | |
| 7,762,874 B2 | 7/2010 | Schlieber et al. | |
| 7,775,859 B2 | 8/2010 | May et al. | |
| 7,775,860 B2 | 8/2010 | Wince et al. | |
| D637,880 S | 5/2011 | Kenny et al. | |
| 7,955,164 B2 | 6/2011 | Wince et al. | |
| 7,955,165 B2 | 6/2011 | May et al. | |
| 7,972,201 B2 | 7/2011 | May et al. | |
| 8,047,900 B2 | 11/2011 | May et al. | |
| D653,523 S | 2/2012 | Wackwitz et al. | |
| 8,142,264 B2 | 3/2012 | May et al. | |
| 8,152,604 B2 | 4/2012 | Kamakura et al. | |
| 8,371,909 B2 | 2/2013 | Lowder | |
| D682,652 S | 5/2013 | McRoberts et al. | |
| 8,439,729 B2 | 5/2013 | May et al. | |
| 2001/0027632 A1 | 10/2001 | Whitby et al. | |
| 2003/0131564 A1 | 7/2003 | Ailey et al. | |
| 2004/0068964 A1 | 4/2004 | Kirk et al. | |
| 2004/0094008 A1 | 5/2004 | Tada | |
| 2004/0144067 A1 | 7/2004 | Cullen | |
| 2004/0250512 A1 | 12/2004 | May et al. | |
| 2005/0034426 A1 | 2/2005 | Griggs et al. | |
| 2005/0039419 A1 | 2/2005 | Griggs et al. | |
| 2005/0053699 A1 | 3/2005 | Whittlesey | |
| 2005/0060957 A1 | 3/2005 | Griggs et al. | |
| 2005/0072119 A1 | 4/2005 | Griggs et al. | |
| 2005/0086911 A1 | 4/2005 | Dutt et al. | |
| 2005/0087075 A1 | 4/2005 | Mysker | |
| 2005/0101240 A1 | 5/2005 | Mysker | |
| 2005/0229541 A1 | 10/2005 | Griggs | |
| 2005/0235608 A1 | 10/2005 | Griggs et al. | |
| 2005/0247026 A1 | 11/2005 | Griggs | |
| 2005/0274088 A1 | 12/2005 | Griggs | |
| 2005/0284108 A1 | 12/2005 | Griggs | |
| 2006/0075722 A1 | 4/2006 | Gupton | |
| 2006/0105690 A1 | 5/2006 | Wince et al. | |
| 2007/0028565 A1 | 2/2007 | Griggs et al. | |
| 2008/0060916 A1 | 3/2008 | Whittlesey | |
| 2008/0250755 A1 | 10/2008 | Griggs et al. | |
| 2009/0100800 A1 | 4/2009 | Griggs et al. | |
| 2010/0287883 A1 * | 11/2010 | May | A22C 11/005 |
| | | | 53/436 |

FOREIGN PATENT DOCUMENTS

| | | |
|---|---|---|
| EP | 0 301 768 | 2/1989 |
| EP | 1464581 | 4/2004 |
| GB | 1491444 | 11/1977 |
| GB | 1564397 | 4/1980 |
| JP | 63281971 | 11/1988 |
| JP | 2002-019735 | 1/2002 |
| WO | WO 2000/020282 | 4/2000 |
| WO | WO 2004/007298 | 1/2004 |

(56) References Cited

FOREIGN PATENT DOCUMENTS

| WO | WO 2005/032759 | 2/2005 |
|----|----------------|--------|
| WO | WO 2005/032759 | 4/2005 |
| WO | WO 2005/044020 | 5/2005 |

OTHER PUBLICATIONS

U.S. Appl. No. 11/262,600, filed Oct. 31, 2005, Wince.
U.S. Appl. No. 11/256,809, filed Oct. 24, 2005, Gupton.
U.S. Appl. No. 10/952,421, Griggs et al.
Brochure *TCM 2250 Pumpable for muscle pieces*, 2 sheets, 1994 ©.
International Search Report and the Written Opinion, corresponding to PCT application No. PCT/US2005/39293; dated Oct. 20, 2006 (9 pages).
International Search Report and Written Opinion of the International Searching Authority for PCT application PCT/US2005/020006 dated Oct. 25, 2005.
International Search Report and Written Opinion of the International Searching Authority for International Patent Application No. PCT/US2005/017252 dated Sep. 7, 2005.
International Search Report and Written Opinion of the International Searching Authority for PCT application No. PCT/US2005/020019 dated Jan. 16, 2006.
Invitation to Pay Additional Fees for PCT application No. PCT/US2005/020019 dated Oct. 28, 2005.
Product Brochure, 1 sheet, "Tipper Clipper®—Signature Series SZ3214 Double Clipper for Netting," © 2002.
Product Brochure, 1 sheet, "Tipper Netter TN-3000 Automatic Netting-Packaging Machine," © 2002.
Product Brochure, 1 sheet, "Tipper Tie-Net, Safely and quickly package plugs before shipping," © 1999.
Product Brochure, 2 sheets, "Net-All Sleeved Plastic Netting System," © 2000.
Product Brochure, 2 sheets, "Tipper Net Z3200 Double Clipper and Plant Netting System," © 2000.
Product Brochure, 4 sheets, "Net-All® Netting Is the answer to All Your Horticultural Applications," © 2001.
Product Brochure, 6 sheets, "Tipper Net for Smoking, Hanging & Decoration, Net-All® Netting Is the Answer," © 2000.
Rigidized Metals Corporation, Corporate Profile, 1 page, <http://www.rigidized.com> accessed on Sep. 23, 2005, but for the purposes of examination, the reference is deemed to be before the priority filing date of the instant application.
www.mcmaster.com, Compressed Air Flow Control Valves, 1 sheet, Date unknown but believed to be before Oct. 2004.
www.tippertie.com/smoked/tcm2250.asp, 2 sheets, date believed to be before Nov. 1, 2004.

* cited by examiner

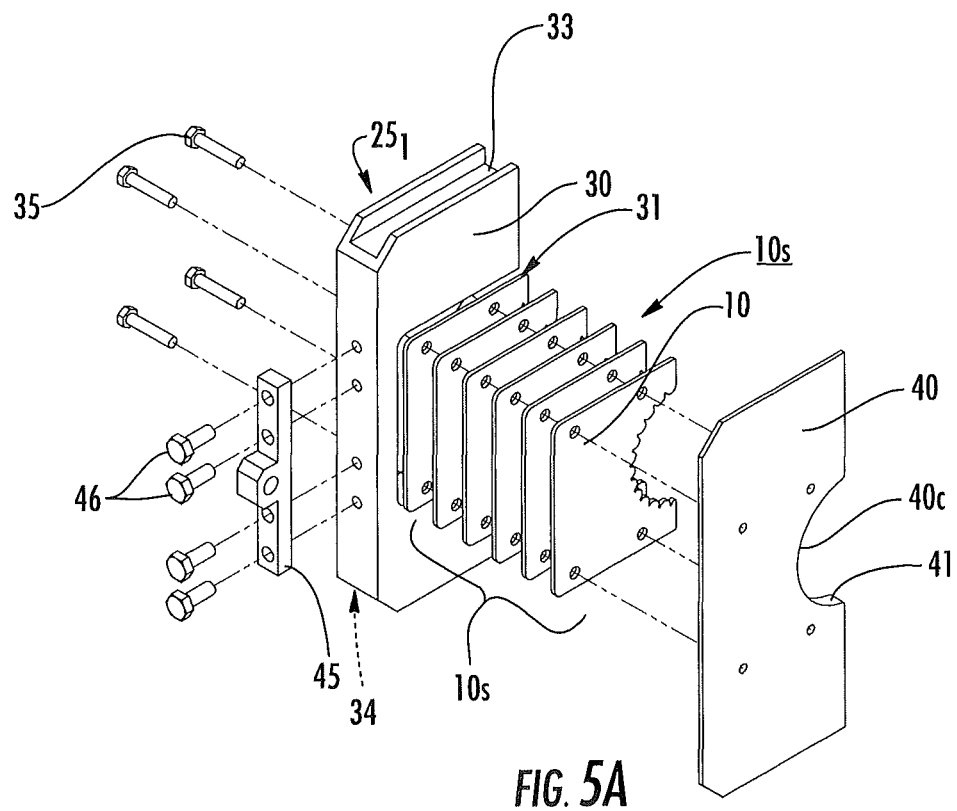
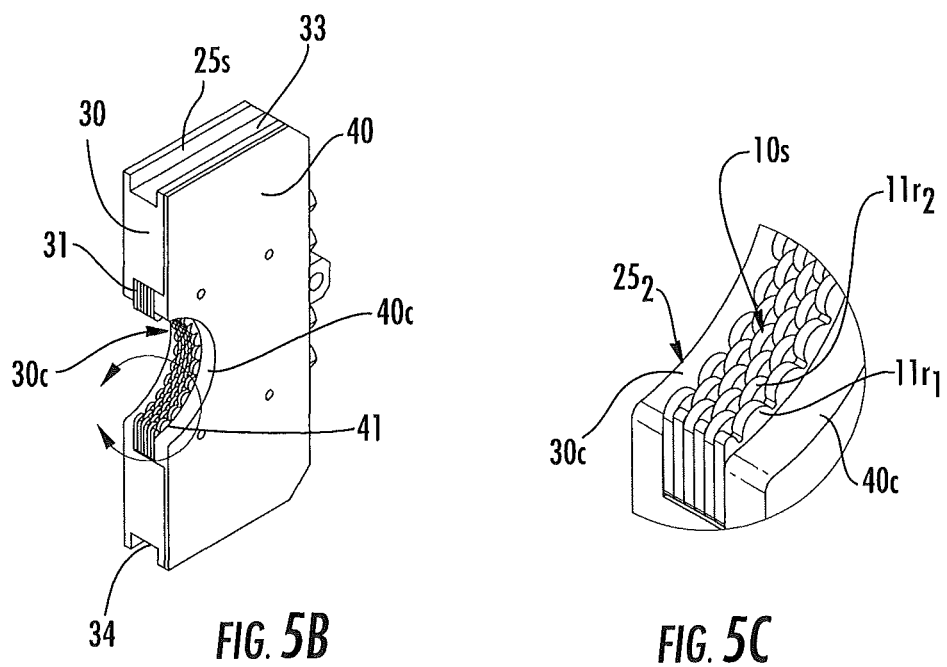
FIG. 5A
FIG. 5B
FIG. 5C

RUCKERS, RERUCKERS, DERUCKERS AND/OR SKIN BRAKES WITH STACKED GRIPPER LAYERS AND RELATED GRIPPERS

RELATED APPLICATIONS

This application claims the benefit of and priority to U.S. Provisional Application Ser. No. 61/869,828, filed Aug. 26, 2013, the contents of which are hereby incorporated by reference as if recited in full herein.

FIELD OF THE INVENTION

The present invention relates to devices that can be used to load, brake or pull n sleeves of material (casings, netting and the like) on or off product chutes.

BACKGROUND OF THE INVENTION

Certain types of commodity and/or industrial items can be packaged by placing the desired product(s) in a covering material, then applying a closure clip or clips to end portions of the covering material to secure the product(s) therein. For non-flowable piece goods, the piece goods can be held individually in a respective clipped package, or as a group of goods in a single package. The covering material can be any suitable material, typically a casing and/or netting material.

A clip attachment apparatus or "clippers" are well known to those of skill in the art and include those available from Tipper Tie, Inc., of Apex, N.C., including product numbers Z3214, Z3202, and Z3200. The clippers can be configured as double clippers that can concurrently apply two clips to the covering proximate a gathered leading or trailing end portion of the package. One clip defines the first end portion of the next package and the other defines the trailing or second end portion of the package then being closed. A cutting mechanism, typically incorporated in the clipper, sever the two packages before the enclosed package is removed from the clipper. U.S. Pat. No. 4,766,713 describes a double clipper apparatus used to apply two clips to a casing covering. U.S. Pat. No. 5,495,701 proposes a clipper configured to selectively fasten a single clip or two clips simultaneously. The contents of each of these patents are hereby incorporated by reference as if recited in full herein.

To place a sleeve of a selected covering on a chute prior to placement of the chute and covering on a packaging machine, an automated or semi-automated rucker may be employed. This type of process is often described by those of skill in the art as "shirring" or "rucking". Examples of ruckers are described in U.S. Pat. Nos. 4,924,552; 5,273,481, and 7,775,859, the contents of which are hereby incorporated by reference as if recited in full herein.

As is known to those of skill in the art, deruckers are used to pull lengths of the sleeve off of the chute during operation while reruckers are used to pull lengths of the sleeve upstream or away from the clipper. U.S. Pat. No. 8,371,909 describes exemplary reruckers that may cooperate with deruckers or perform both functions and optionally also act as a brake or cooperate with another component as the brake (e.g., a so-called "skin brake"), the contents of which are hereby incorporated by reference as if recited in full herein.

SUMMARY OF EMBODIMENTS OF THE INVENTION

Embodiments of the present invention provide a new gripper configuration with one or more gripper layers having a semi-circular inward facing profile with teeth.

Embodiments of the invention are directed to a rucker, rerucker, derucker or skin break gripper that includes at least one planar gripper layer with a perimeter having a front facing semi-circular side with a plurality of spaced apart teeth.

The at least one planar gripper layer can be a plurality of planar semi-rigid gripper layers stacked together with the teeth facing inward. Each layer can be configured so that the front facing semi-circular side has valleys, with a respective valley separating at least some adjacent teeth.

The teeth can be round teeth.

The at least one layer can have a thickness that is between about 0.125 inches to about 0.5 inches.

The semi-circular side can be sized to correspond to a semi-circular outer wall of a chute or horn having a diameter between about 3 inches and about 8 inches.

The at least one planar gripper layer can be a set of between 2-10 cooperating stacked planar gripper layers.

The at least one planar gripper layer can be a plurality of abutting planar gripper layers. Neighboring gripper layers can be arranged so that at least some teeth in a first neighboring gripper layer are misaligned to be offset from underlying or overlying or underlying and overlying teeth in a second neighboring gripper layer.

The stacked layers can be arranged so that teeth and valleys serially repeat over the semi-circular side and so that teeth in one layer are misaligned with teeth in at least one abutting layer.

The gripper layer can have a monolithic polymeric and/or elastomeric body. The gripper layer can be semi-rigid and have a thickness between about 0.125 inches to about 0.5 inches with between about 10-20 teeth.

Still other embodiments are directed to gripper assemblies. The gripper assemblies include a stacked set of cooperating gripper layers having a perimeter with a forward facing semi-circular profile with a plurality of teeth.

The gripper assemblies can include a housing holding the stacked set of gripper layers and a bracket attached to the housing configured to attach to an actuation cylinder.

The housing can include at least one laterally extending channel that is configured to cooperate with a rail to allow the gripper assembly to controllably reciprocate in response to actuation of the actuation cylinder.

The gripper assemblies can include a housing holding the stacked set of gripper layers. The housing can have a curved forward facing side and a primary surface with a recess having a perimeter shape sized and configured to receive the stacked set of gripper layers.

The stacked set of gripper layers can include planar semi-rigid gripper layers stacked together with respective teeth facing inward. Each layer can be configured so that a respective front facing semi-circular profile comprises valleys, with a respective valley separating at least some adjacent teeth.

The teeth can be round teeth. The semi-circular profile can be sized to correspond to a semi-circular outer wall of a chute or horn having a diameter between about 3 inches and about 8 inches.

The stacked set of cooperating gripper layers can be arranged as a plurality of abutting planar gripper layers. Neighboring gripper layers can be arranged so that at least some teeth in a first neighboring gripper layer are misaligned to be offset from teeth in a second neighboring gripper layer.

The stacked set of cooperating gripper layers can be arranged as a plurality of abutting planar gripper layers. Neighboring gripper layers can be arranged so that at least some teeth in a first neighboring gripper layer are misaligned to be offset from teeth in a second neighboring gripper layer so that one row of the layers is configured with teeth and valley in alternating layers.

The stacked layers can be arranged so that teeth and valleys serially repeat over the semi-circular profile. Teeth in one layer are misaligned with teeth in at least one abutting layer. The gripper layers can have a respective monolithic polymeric and/or elastomeric semi-rigid body with a thickness between about 0.125 inches to about 0.5 inches. At least some of the gripper layers have between about 10-20 teeth.

Yet other embodiments are directed to a set of cooperating gripper assemblies. The set includes first and second cooperating gripper assemblies, each gripper assembly including a stacked set of cooperating gripper layers having a perimeter with a forward facing semi-circular profile with a plurality of teeth. The first gripper assembly is oriented so that the forward facing semi-circular profile faces the second gripper assembly forward facing profile to form a circle when the gripper assemblies are in a closed configuration residing adjacent each other, wherein the first and second cooperating gripper assemblies are configured to close against an outer wall of a horn or chute to contact covering material held thereon.

The teeth can be round teeth. The semi-circular profile can be sized to correspond to a semi-circular outer wall of the chute or horn having a diameter between about 3 inches and about 8 inches. The stacked set of cooperating gripper layers can be arranged as a plurality of abutting planar gripper layers. The stacked layers can be arranged so that teeth and valleys serially repeat over the semi-circular profile. Teeth in one layer can be misaligned with teeth in at least one abutting layer.

Still other embodiments are directed to an apparatus for rucking, derucking, rerucking and/or braking covering material from or onto a chute body. The apparatus includes a frame and a gripper assembly. The gripper assembly includes first and second cooperating gripper subassemblies, each having a perimeter with one side having a semi-circular shape. The side having the semi-circular shape comprises a set of stacked planar gripper layers, at least some of the layers having spaced apart teeth. The apparatus also includes an actuator attached to the gripper assembly and in communication with a controller. The first and second gripper subassemblies can have an automated stroke cycle whereby each is configured to travel inwardly a distance sufficient to snugly abut an outer surface of a chute or horn body and remain in contact with the chute or horn body to pull covering material or brake the covering material.

The gripper subassemblies can each include a housing that includes at least one laterally extending channel that is configured to cooperate with a rail to allow the gripper assembly to controllably reciprocate in response to extension and retraction of the actuator. The housing can have a curved forward facing side and a primary surface with a recess having a perimeter shape sized and configured to receive the stacked set of gripper layers.

It is noted that any one or more aspects or features described with respect to one embodiment may be incorporated in a different embodiment although not specifically described relative thereto. That is, all embodiments and/or features of any embodiment can be combined in any way and/or combination. Applicant reserves the right to change any originally filed claim or file any new claim accordingly, including the right to be able to amend any originally filed claim to depend from and/or incorporate any feature of any other claim although not originally claimed in that manner.

These and other objects and/or aspects of the present invention are explained in detail in the specification set forth below.

These and other objects and/or aspects of the present invention are explained in detail in the specification set forth below.

BRIEF DESCRIPTION OF THE DRAWINGS

FIG. 5A is an exploded view of a stacked gripper assembly according to embodiments of the present invention.

FIG. 5B is an assembled view of the assembly shown in FIG. 5A.

FIG. 5C is an enlarged perspective view of an end of the stacked gripper assembly shown in FIG. 5B.

DESCRIPTION OF EMBODIMENTS OF THE INVENTION

Figure 1A:
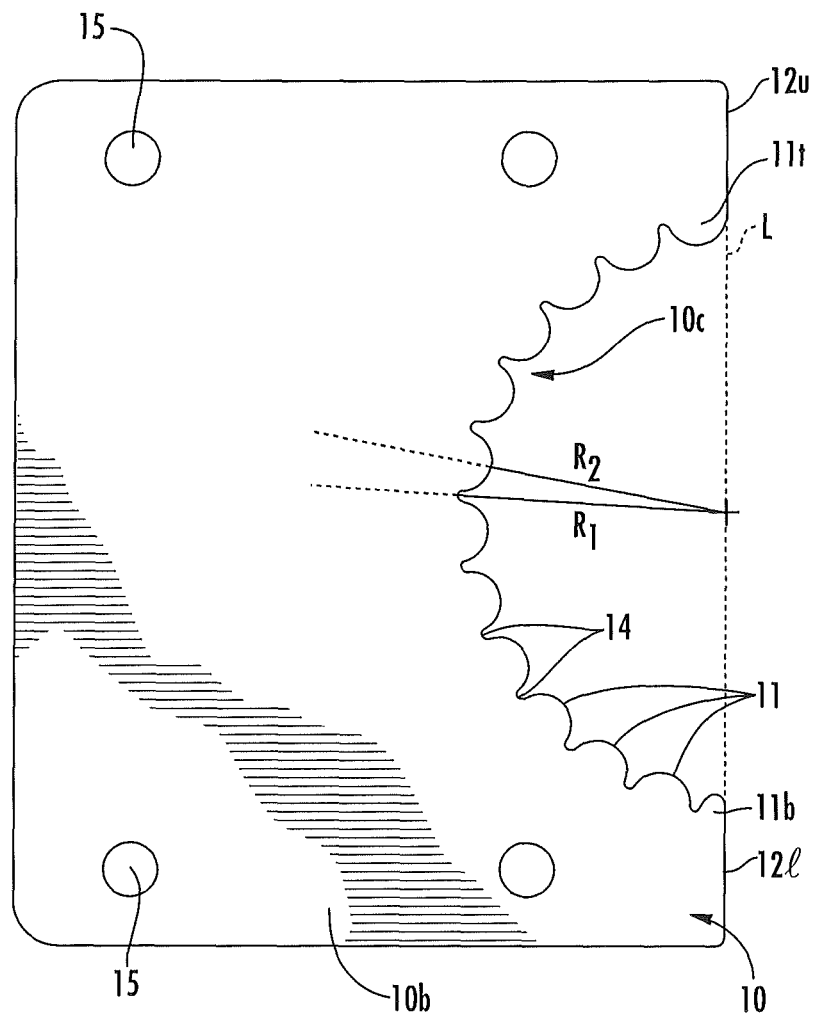
FIG. 1A is a top view of an exemplary gripper layer according to embodiments of the present invention.

The present invention will now be described more fully hereinafter with reference to the accompanying figures, in which embodiments of the invention are shown. This invention may, however, be embodied in many different forms and should not be construed as limited to the embodiments set forth herein. Like numbers refer to like elements throughout. In the figures, certain layers, components or features may be exaggerated for clarity, and broken lines illustrate optional features or operations, unless specified otherwise. In addition, the sequence of operations (or steps) is not limited to the order presented in the claims unless specifically indicated otherwise. Where used, the terms "attached", "connected", "contacting", "coupling" and the like, can mean either directly or indirectly, unless stated otherwise. The term "concurrently" means that the operations are carried out substantially simultaneously.

In the description of the present invention that follows, certain terms are employed to refer to the positional relationship of certain structures relative to other structures. As used herein, the term "front" or "forward" and derivatives thereof refer to the general or primary direction that the sleeve or material is loaded onto the chute body; this term is intended to be synonymous with the term "downstream," which is often used in manufacturing or material flow environments to indicate that certain material traveling or being acted upon is farther along in that process than other material. Conversely, the terms "rearward" and "upstream" and derivatives thereof refer to the directions opposite, respectively, the forward and downstream directions.

As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. As used herein, phrases such as "between X and Y" and "between about X and Y" should be interpreted to include X and Y. As used herein, phrases such as "between about X and Y" mean "between about X and about Y." As used herein, phrases such as "from about X to Y" mean "from about X to about Y."

The term "about" when used with a number means that the value can vary between +/−20%.

The term "semi-rigid" means that the member can retain a three-dimensional self-supported shape but can flex when sufficient force is applied.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the specification and relevant art and should not be interpreted in an idealized or overly formal sense unless expressly so defined herein. Well-known functions or constructions may not be described in detail for brevity and/or clarity.

The term "automated" and "automatic" refers to operations that are carried out without requiring manual assistance and are typically carried out using electronic controls and programmatic (computer) direction. The terms also contemplate the use of manual activation of the automatic operations. The term "frame" means a generally skeletal structure used to support one or more assemblies, modules and/or components. The term "modular" means that a subassembly is designed with standardized dimensions, mounting features and/or configurations for interchangeable use with replacement modules of the same or similar type and/or other selected different modules.

The present invention is particularly suitable for cooperating with chutes and covering materials that may employ closure clips to enclose discrete objects in the covering material. The covering material may be natural or synthetic and may be a casing material that can be sealed about a product or may be netting. The casing can be any suitable casing (edible or inedible, natural or synthetic) such as, but not limited to, collagen, cellulose, plastic, elastomeric or polymeric casing. The term "netting" refers to any open mesh material formed by any means including, for example, knotted, braided, extruded, stamped, knitted, woven or otherwise. Typically, the netting is configured so as to be stretchable in both axial and lateral directions, but fixed diameter netting or covering may also be used. In some embodiments, the covering material is a fixed diameter or compression netting material (known as "fixed diameter net") comprising cotton, available from Jif Pak (Vista, Calif.) and PCM (Greenville, S.C.).

In some embodiments, the covering material is substantially non-elastic or frangible when laterally stretched more than 10%, and typically cannot be stretched, without unacceptable degradation, more than 5% beyond the bounds of the underlying target chute. In some embodiments, the covering can be a generally closed weave delicate and/or relatively inelastic material (at least in the non-axial dimension).

Netting or other covering material may be used to package discrete meat products such as loaves of meat, boned ham, spiral sliced ham, deboned ham, turkey, turkey loaves held in molds, or other meat or items, directly or with the items held in subcontainers and/or wraps such as molds, trays, boxes, bags, absorbent or protective sheets, sealant, cans and the like. Other embodiments of the present invention may be directed to package other types of food such as cheese, bread, fruit, vegetables, and the like. Examples of non-food items that may be packaged using embodiments of the present invention include living items such as flora, trees, and the like, as well as inanimate objects. Additional examples of products include discrete, semi-solid or solid non-flowable objects such as firewood, pet food (typically held in a container if the wet type), recreational objects (such as toy or game balls), or other solid or semi-solid objects. The product may be packaged for any suitable industry including horticulture, aquaculture, agriculture, or other food industry, environmental, chemical, explosive, or other application. Netting may be particularly useful to package ham or turkeys, manufactured hardware such as automotive parts, firewood, explosives, molded products, and other industrial, consumable, and/or commodity items.

Embodiments of the present invention may be particularly suitable for operating with relatively delicate, substantially inelastic (at least in the radial direction) netting, such as cotton fiber fixed diameter coverings that may be configured to hold large meat products, such as meat products weighing over 20 pounds, typically about 35-40 pounds.

In some embodiments, the sleeves of covering placed on the product chute can be greater than or equal to about 120 feet in length and sufficient to enclose between about 50-80 discrete objects, e.g., compressed whole muscle or hams, and typically about 60 discrete packages of meat objects.

Referring now to FIG. 1A, a gripper layer 10 with front facing, spaced apart teeth 11 is shown. The teeth 11 can be regularly or irregularly spaced apart about a semi-circular perimeter shape 10c of the gripper layer 10. The teeth of the gripper layer 10 can comprise a polymer, e.g., an elastomeric material. The gripper layer 10 can have a body 10b that is a monolithic thin layer of polymeric and/or elastomeric material and can have a thickness between about 0.1 inches to about 0.5 inches thick, typically between about 0.125 inches and about 0.25 inches, and can be about 0.125 inches. The gripper layers 10 are typically used in combination and each gripper layer can have the same thickness or the thickness may vary layer to layer or for one or more layer.

The teeth 11 of the gripper layer 10 can comprise a urethane material or coating. In other embodiments, the outer surface of the teeth 11 may be surface treated to provide increased frictional areas relative to the rear of the layer 12b, e.g., be coated, embossed, etc.

The semi-circular teeth shape can have an outer radius measured from a line L to an outermost front end of the teeth (R2) and an inner radius R1 measured at the valley 14 between adjacent teeth 11. The outer radius R2 can correspond to a radius of a chute or horn 50 (FIGS. 7-11) so that the teeth 11 provide multiple contact points to be able to pinch, clamp or trap covering 60 (FIGS. 10, 11) on the horn or chute 50 and pull the covering in a desired direction or just exert contact force for braking, depending on whether the gripper layer 10 is used in a gripper assembly 25 for rucking, rerucking, derucking or braking. The distance R2 corresponds to the diameter of the horn relative to the position of the gripper during a shiring or braking or derucking operation, for example. The R2 dimension can correspond to the horn diameter that it will be used with, e.g., for diameters of between 3-8 inches, the R2 dimension will be 1.5 inches to 4 inches, respectively. The R1 dimension can be greater than the R2 dimension, typically by about 0.1 inches to about 0.5 inches. The larger variation may be particularly suitable for the larger diameter R2 dimensions. For example, R1 can be 1.5 inches, and a corresponding R2 can be 1.6 inches, or R1 can be 4 inches and R2 can be 4.5 inches.

The teeth 11 can have a radius of curvature R3 measured from a centerline location internal to the respective tooth (see, the line in FIGS. 2 and 3 on an exemplary tooth) that is between about 0.1 inches to about 0.7 inches, typically between about 0.16 inches to about 0.52 inches.

Figure 1B:
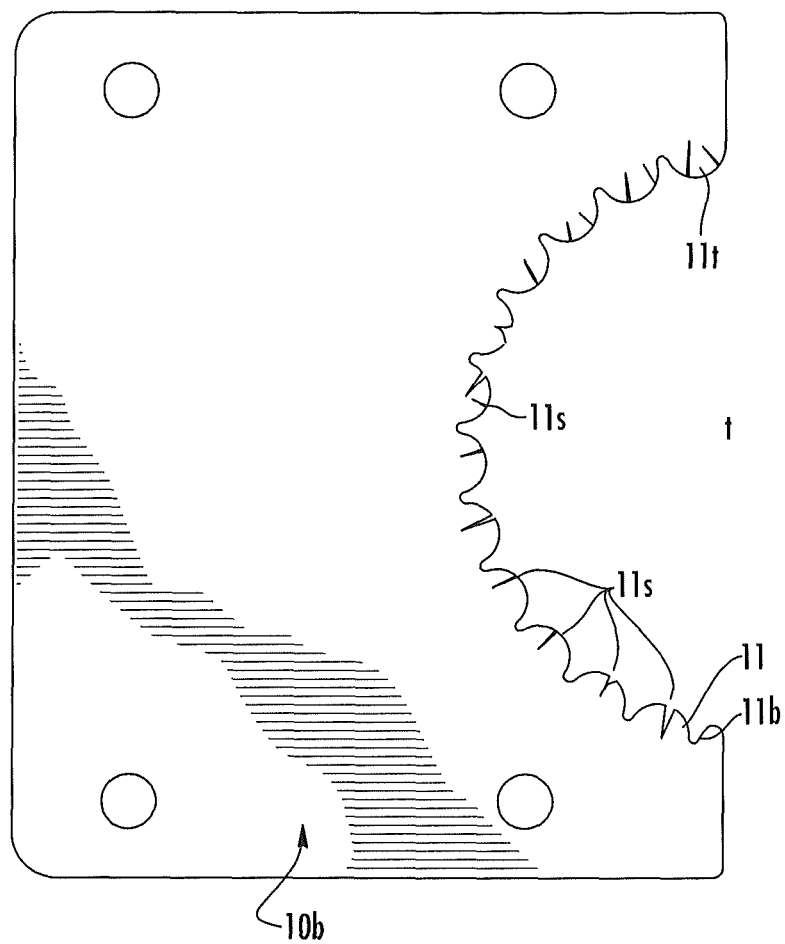
FIG. 1B is a top view of another exemplary gripper layer according to embodiments of the present invention.

The teeth 11 can be round, typically semi-circular as shown, but other shapes may be used to provide a suitable point of contact shape. The teeth 11 can have the same shapes and sizes, different sizes, different shapes or different shapes and sizes. The teeth 11 can have a continuous outer edge or a discontinuous outer edge. FIG. 1B illustrates that the teeth 11 can have one or more inwardly extending cuts, slots or spaces 11s in the outer edge. Each tooth 11 can have the same or different configured and/or number of slits 11s, where used.

Figure 4:
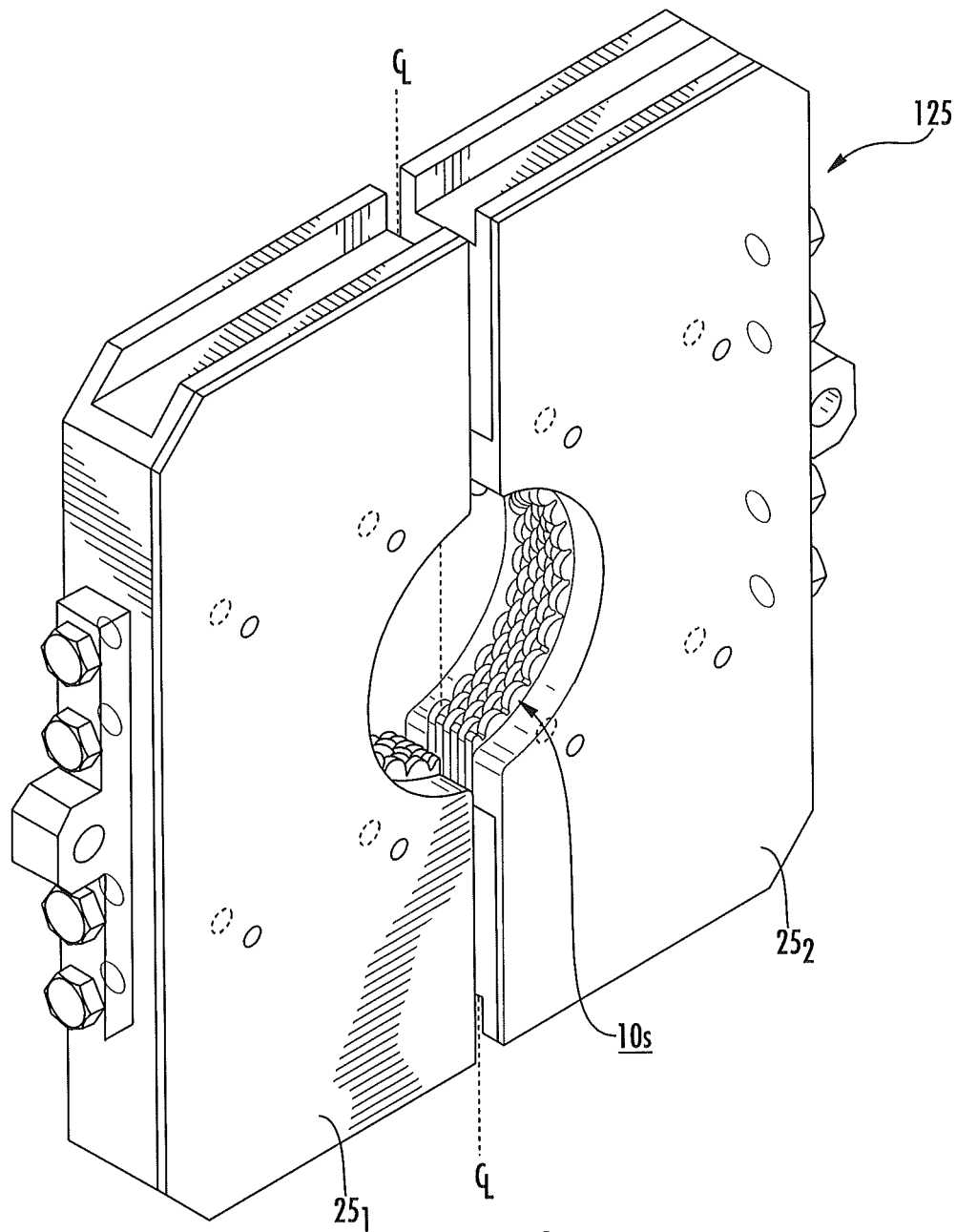
FIG. 4 is a front perspective view of a stacked gripper assembly according to embodiments of the present invention.

FIGS. 1A and 1B also illustrate that at least one of the teeth 11 has a different shape from the others, shown as the bottom tooth 11b (compare, the top tooth 11t and neighboring teeth 11 with the bottom tooth 11b, for example). The gripper layer 10 can include a plurality of apertures 15 for attachment to a gripper assembly 25 (FIG. 4).

Figure 8:
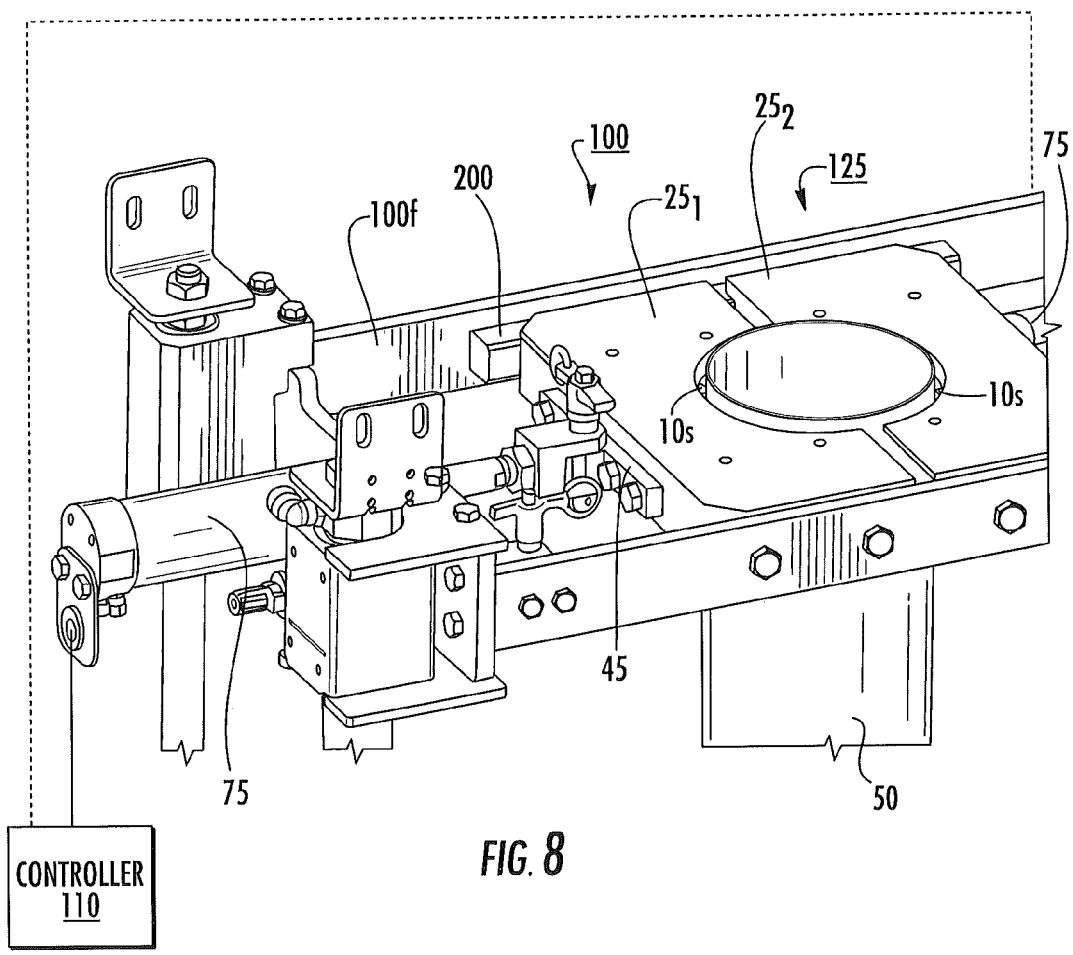
FIG. 8 is a top perspective view of the portion of the rucker assembly shown in FIG. 7, illustrating the gripper assembly in a closed configuration according to embodiments of the present invention.

The outermost edges of the teeth 11 can all reside at a common radius distance (shown as R2) from a line "L" drawn between outermost upper and lower edges 12u, 12l bounding the semi-circular perimeter shape and can be separated by valleys 14 residing at a greater distance from the line L, shown as distance R1 such that R1>R2. The line L can reside adjacent to a centerline C/L of two cooperating sets of grippers 12s in a closed configuration (FIGS. 4 and 8).

Figure 2:
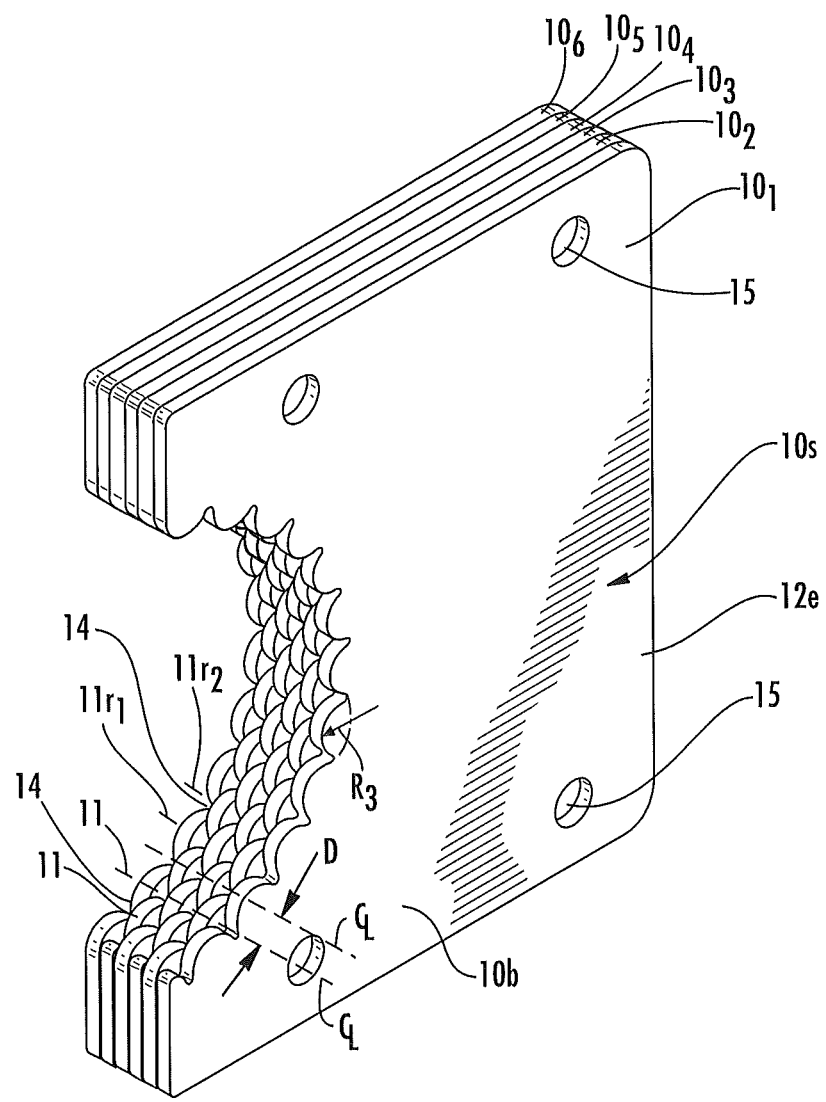
FIG. 2 is a front perspective view of a stacked arrangement of gripper layers according to embodiments of the present invention.

Typically, the gripper layer 10 is used in a cooperating set of stacked layers 10s as shown in FIG. 2. The set of layers 10s can be configured so that neighboring layers abut each other and with adjacent teeth offset a distance "D". The set of layers 10s can include at least two, typically between about 2-10 layers, shown as six layers $10_1$-$10_6$, but other numbers of layers 10n can be used including, two, three, four, five, six, seven, eight, nine, ten, eleven, twelve and even more.

Figure 3:
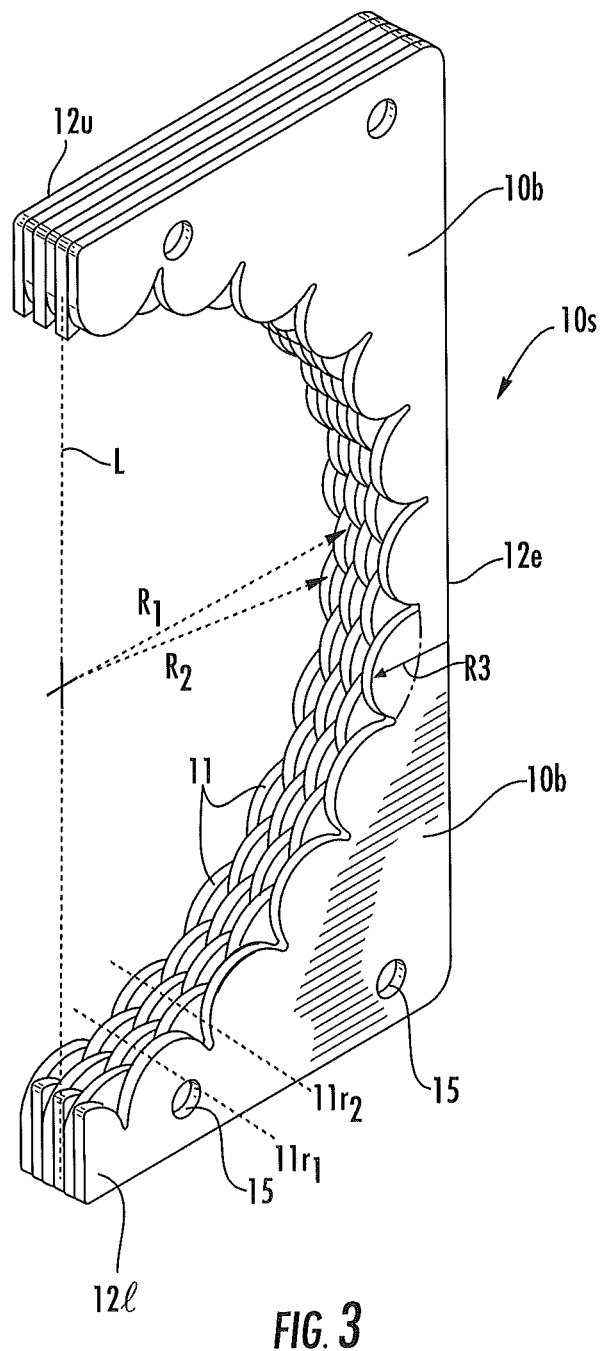
FIG. 3 is a front perspective view of another stacked arrangement of gripper layers according to embodiments of the present invention.

The number of teeth 11 for a layer 10 can vary but is typically between about 10-50, more typically between about 10-20, shown as 12 "full size" teeth or 13 teeth with one tooth smaller than the others, for both larger and smaller sized gripper layers (FIGS. 2 and 3). In other embodiments, the number or teeth can vary corresponding to R1/R2 size.

As shown in FIGS. 2 and 5C, for example, the set of the layers of grippers 10s can be oriented so that the centerline C/L of the teeth of neighboring layers are circumferentially offset by a distance "D" and/or staggered to form adjacent rows $11r_1$, $11r_2$ of serially alternating layers of teeth and valleys. Stated differently, the first row $11r_1$ has a first layer with a tooth 11 at a first circumferential location. Behind that tooth, in the second layer, aligned with the tooth in the first layer, is a valley 14 and behind that valley 14, in the third layer, is a tooth 11, et. seq. The adjacent row $11r_2$ has a first layer with a valley 14, a second layer with an aligned tooth 11, and a third layer with a valley 14 et seq., to form serially alternating layers of aligned teeth 11 and valleys 14.

FIG. 3 illustrates that the set of gripper layers 10s can be provided in different sizes to have different size openings. FIG. 2 illustrates an example of a gripper layer set 10s that can cooperate with a 3.5 inch diameter horn or chute 50 while FIG. 3 illustrates an example of a gripper layer set 10s that can cooperate with an 8 inch diameter horn or chute 50. The body of the larger size gripper layers can be configured so that the teeth 11 reside closer the back edge 12e compared to the smaller size gripper layers. Each configuration of respective gripper layers 10 can have the same arrangement of attachment apertures 15 (shown as two upper and two lower) and may have the same size apertures 15.

The gripper layers 10s can be configured to cooperate with another set of gripper layers to operate with different size horns or chutes 50. The different sets 10s can be configured to cooperate with chutes or horns 50 having respective different diameters of between about 3 inches to about 8 inches, such as 3 inches, 3.5 inches, 4 inches, 4.5 inches, 5 inches 5.5 inches, 6 inches, 6.5 inches, 7 inches, 7.5 inches and 8 inches.

FIGS. 5A and 5B illustrate an example of a gripper assembly 25. As shown, the gripper assembly 25 includes a housing 30 that holds the set of gripper layers 10s so that the teeth face inward. The housing can be metallic and rigid or semi-rigid. Where used with food packaging systems, the housing 30 should be able to meet USDA or other regulatory guidelines for food compatibility and cleanliness.

The gripper assembly 25 can include a back plate 40 that attaches to the housing 30 and holds the gripper layers 10s between the back plate 40 and housing 30. The housing 30 and back plate 40 can each have a curved inwardly facing portion 30c, 40c, respectively. The curved portions 30c, 40c can have a common shape (e.g., the same shape) with a common radius of curvature (e.g., the same radius of curvature) sized to allow the contact teeth 11 to rise above the respective outer boundary of the wall of the curved portions 30c, 40c. In other embodiments, the curved segments are not required or may have a different shape.

Figure 6:
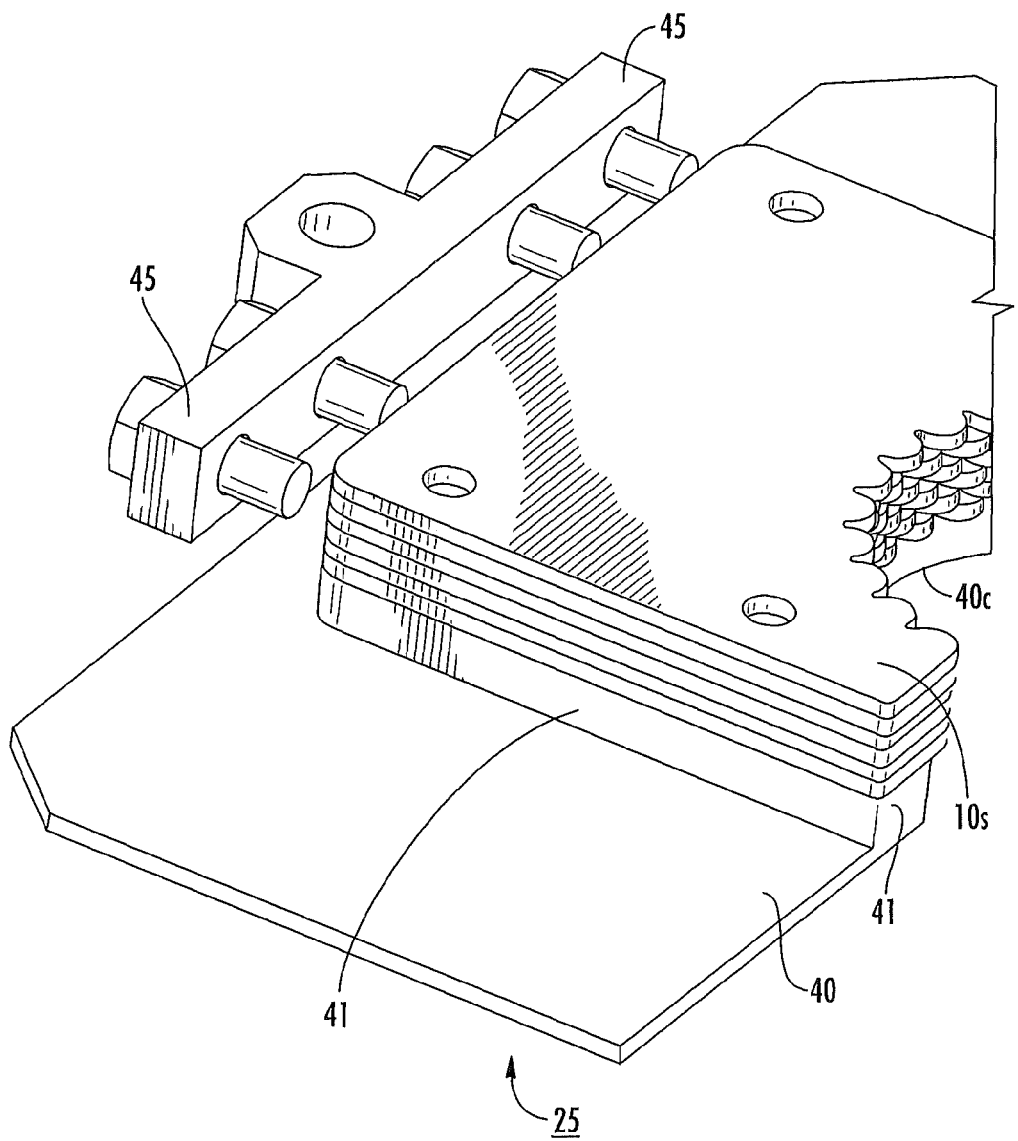
FIG. 6 is an enlarged partial assembled perspective view of the assembly shown in FIG. 5A.

FIG. 6 illustrates the stacked layers 10s on the back plate 10. FIG. 5B illustrates that the back plate can have an inner medial segment that is thicker than the outer surrounding portions. The inner medial segment 41 can have the curved portion 40c. The inner medial segment 41 can have a perimeter with three sides having the same shape as the three straight sides of the gripper layers 10. The inner medial segment 41 can also reside inside the recess of the housing 31 to compress or snugly hold the layers 10s in position against the housing 30 as shown in FIG. 5B.

Attachment members 35 can extend through the housing 30, the layers 10s and the back plate 40. The attachment members 35 can have any appropriate configuration. As shown, the attachment members 35 comprise threaded bolts.

The gripper assembly 25 can include a cylinder block 45 that attaches to the housing 30. The cylinder block 45 can attach to an actuation cylinder 75 (FIG. 8) of a system, such as a rucker system 100 (FIG. 8). The cylinder block 45 can be attached to an outer side of the housing 30 using attachment members 46.

Figure 7:
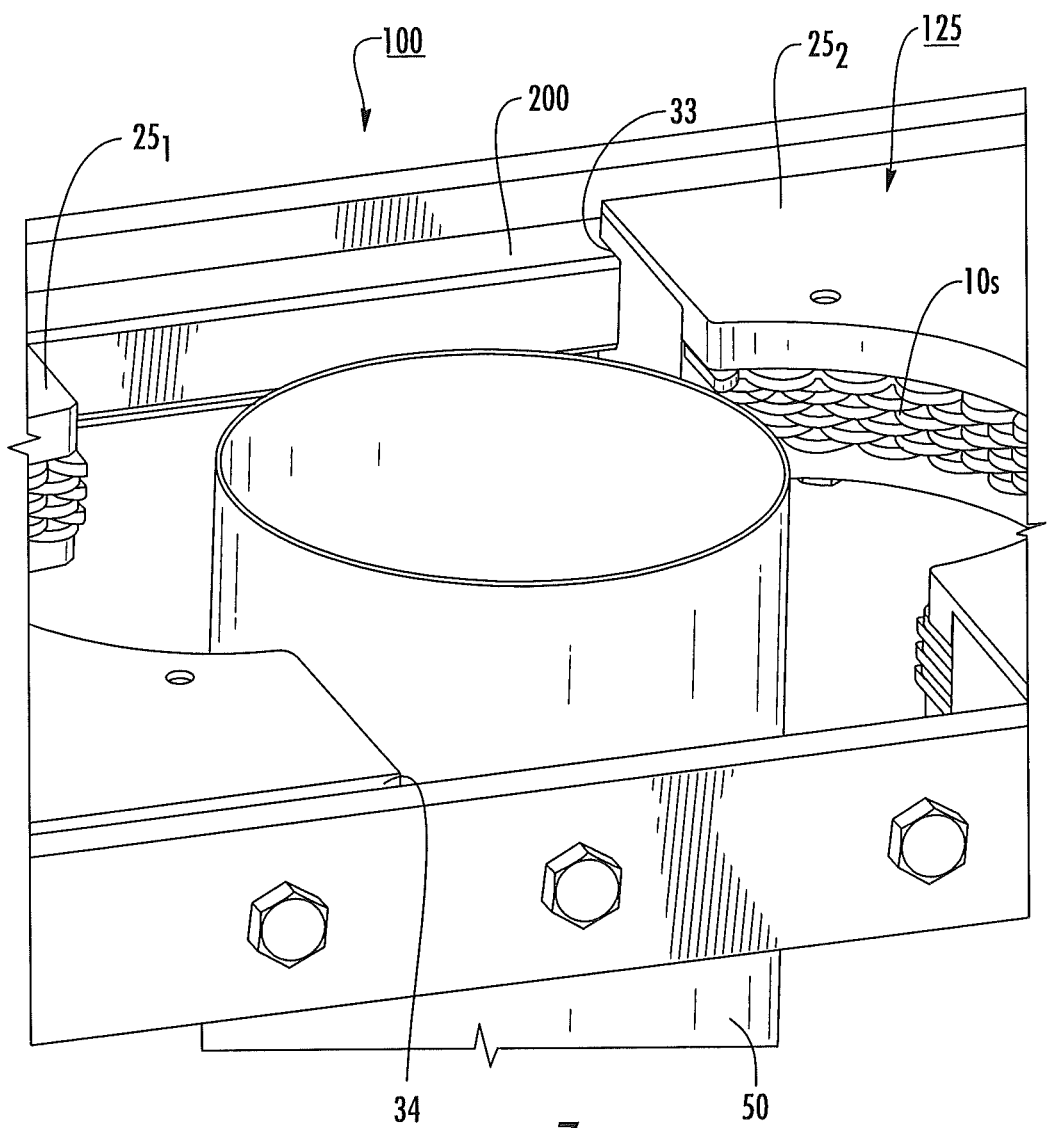
FIG. 7 is a top perspective view of a portion of a rucker assembly according to embodiments of the present invention.
Figure 9:
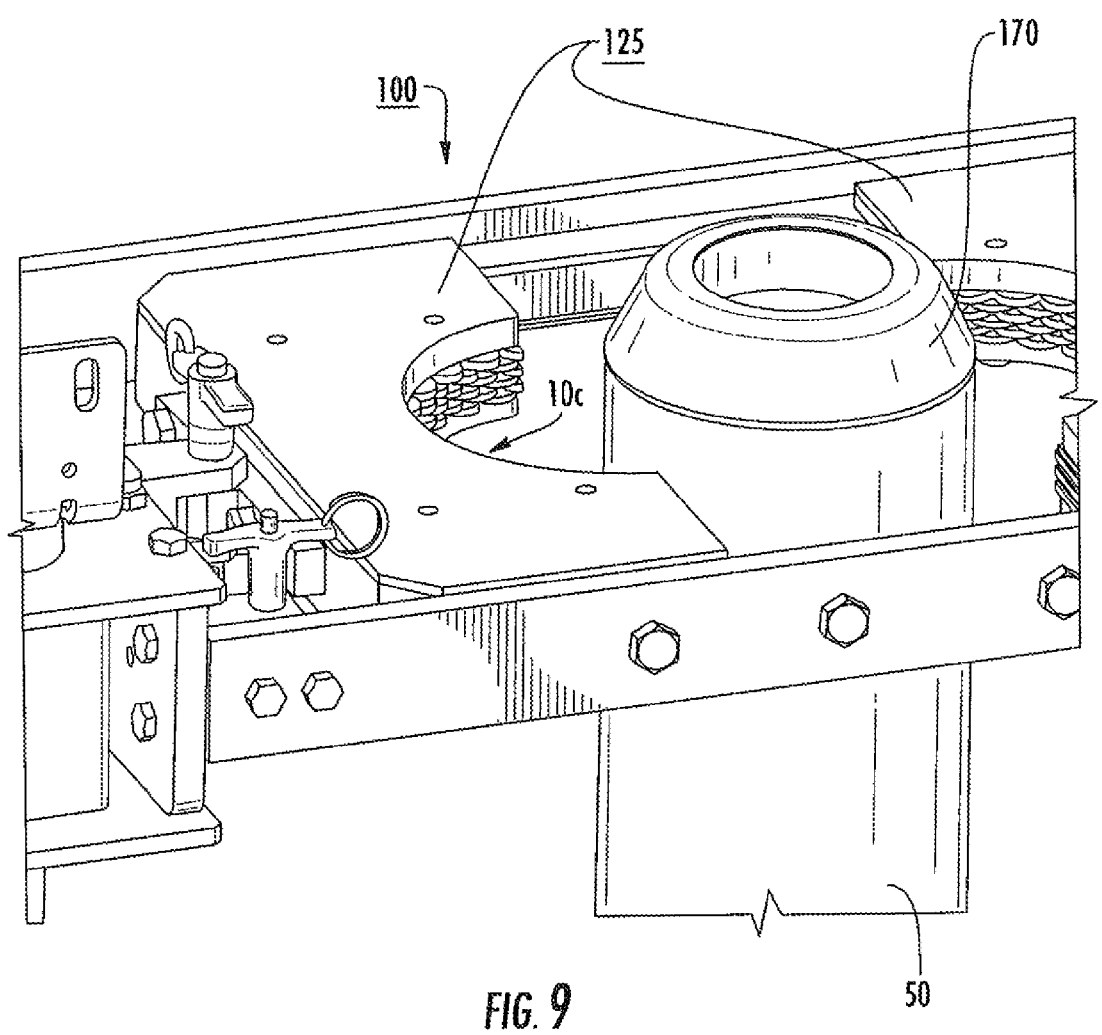
FIG. 9 is a top perspective view of the rucker assembly shown in FIGS. 7 and 8 illustrating an optional loading cap on the horn according to embodiments of the present invention.

The gripper assembly 25 can be used in cooperating pairs 125 as shown in FIGS. 7-9. Thus, the pairs or set of the assemblies 125 can be termed the gripper assembly and the respective individual assemblies 25 can be termed "subassemblies." The gripper pair 125 (or assembly) can be configured so that the gripper (sub)assemblies $25_1$, $25_2$ travel closer together to close against opposing sides of a respective chute or horn 50. The gripper pairs 125 can be in communication with a controller. The controller 110 can be configured so that the first and second gripper (sub)assemblies 25 have an automated stroke cycle whereby the controller directs the actuators 75 to actuate to cause each to travel inwardly a distance sufficient to snugly abut an outer surface of a chute or horn body and remain in contact with the chute or horn body to pull covering material or brake the covering material. Thus, the controller 110 can direct the actuation cylinders 75 to extend and retract to close and open the respective grippers $25_1$, $25_2$ between a home or non-contact position and a chute contact position as shown in FIGS. 7 and 8, for example, or direct the actuation cylinders 175 and/or 148 in FIG. 10 similarly to move to carry out a desired function.

The housing 30 can include upper and lower channels 33, 34 that cooperate with rails 200 to allow the gripper assemblies 25 to controllably translate in a fixed direction (FIGS. 7, 8). The housing 30 may have the reverse configuration. For example, the housing 30 can alternately include rails that cooperate with recesses in a frame or support structure 100f or the housing can include a channel and a rail that cooperate with a rail and a channel of a frame 100f (not shown).

The actuation cylinders 75 can be electric, air or hydraulic.

Where different diameter size gripper assemblies 25 are used, some of the components may be common among the different assemblies 25, such as the cylinder block 45 and attachment members 35, 45, while the other components may have similar form factors but vary in size to accommodate the larger size gripper layers 10 (e.g., FIG. 3).

To be clear, the gripper assemblies 25 can be used in different orientations, depending on the end use and configuration of the associated system, e.g., skin brake, rucker, derucker or rerucker.

FIGS. 7-9 illustrate an exemplary rucker 100. In the embodiment shown, the rucker 100 holds the horn or chute 50 vertical during rucking. The rucker 100 can be configured to move the horn or chute 50 up or down while the gripper assemblies 125 pull the casing onto the horn or chute 50 to nick a length of the casing material onto the horn. The gripper assemblies 125 can also or alternatively be mounted to travel vertically for the nicking. Horizontal ruckers may also be used which would orient the gripper assemblies 25 orthogonal to the orientation shown in FIGS. 7-9.

The rucker 100 can include a chute platform that can remain fixed (substantially stationary in at least the axial direction) or may move vertically during the rucking or shirring operation. The gripper assemblies 25 can be mounted to the laterally extending rail 200. The gripper assemblies 25 may optionally also be mounted to vertical rails so as to be able to move up and down about a primary (wheel) movement axis. In other embodiments, the chute or horn resides on a platform that travels up or down for the shirring or rucking operation. The rail can be in communication with a drive system. Suitable drive systems are well known to those of skill in the art.

FIG. 9 illustrates that a tapered loading cap 170 can be held on an end of the chute or horn 50 (such as in the horn/chute 50 of FIGS. 7 and 8) to facilitate shirring or nicking of the material.

By configuring the chute or horn 50 to be stationary, a lower profile apparatus can be used as the chute or horn 50 does not need to move relative to the apparatus 100. This may be particularly useful for longer chute lengths.

The chute or horn 50 may reside on a stationary support platform in the rucker 100. The rucker apparatus can be adapted to accept chutes or horns having different lengths and/or shapes, typically lengths between about 2-10 feet (with the longer chutes or horns being between about 6-10 feet).

The stroke length of translation for the side to side or vertical stroke of movement along a respective axis of movement can be adjustable so as to accommodate different size chutes and gripper assemblies and/or to distribute lengths of the covering over a desired length of a target chute, which may vary by chute and/or covering type.

The apparatus 100 can be configured to accommodate different size and/or shape chutes 50 with minimal set-up time. The controller 110 can be configured (typically at an OEM site, but can be field upgraded) with different running program modules (which may vary speed, stroke distance, gripping pressure, timing and the like) depending on the running configuration of the chute, gripper assembly 25 size and/or covering material.

Figure 11:
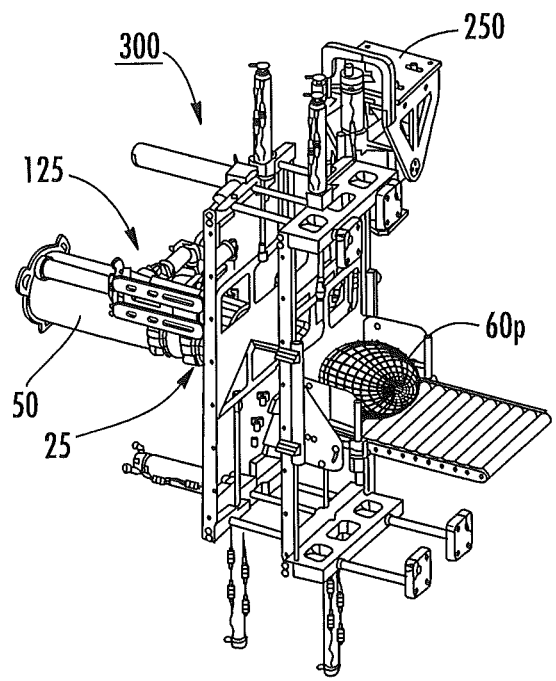
FIG. 11 is a side perspective view of the gripper assembly shown in FIG. 10 positioned in proximity to a clipper and is configured to move longitudinally toward and/or away from the clipper according to embodiments of the present invention.
Figure 10:
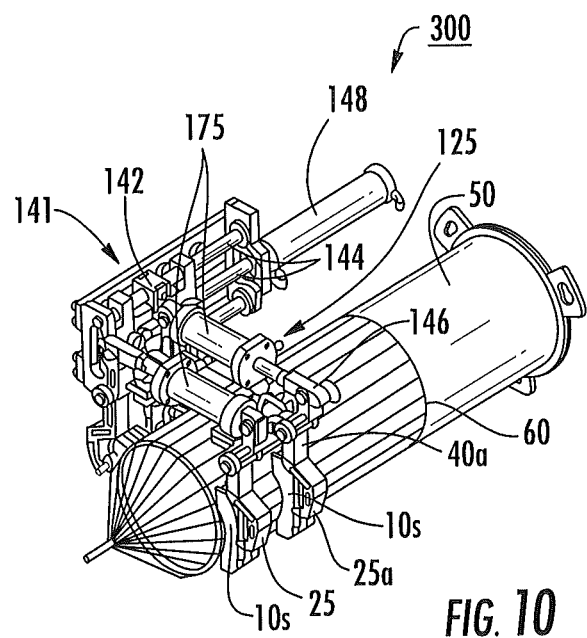
FIG. 10 is a side perspective view of a gripper assembly that can be used as one or more of a brake, derucker or rerucker according to embodiments of the present invention.

FIGS. 10 and 11 illustrate that the gripper assemblies 25 can be used with a packaging machine 300 that cooperates with a clipper 250 to enclose a target object in clipped package 60p comprising the covering material 60 from the horn or chute 50.

The gripper assemblies 25 can translate axially or may be axially stationary (e.g., the latter an option for skin brake where the gripper assemblies 25 apply a slip brake force onto the covering 60). The cooperating sets 125 of gripper assemblies 25 can be used for one or more of derucking, rerucking or braking. FIGS. 10 and 11 show two sets of cooperating gripper pairs 125 that can be used to perform different functions or cooperate to carry out a respective function or mode (e.g., derucking or rerucking). However, the packaging system 300 can include a single gripper pair 125 that may optionally be used to carry out one or more of the rerucking, derucking or braking. In the embodiment shown, there are actuation cylinders 175 attached to pivoting arms 146 that cause the gripper assemblies to controllably move against the horn or chute 50. The system 300 can also include a rail assembly 141 with a bracket 142 that slidably axially translates the gripper assemblies 25 along one or more rails 144 in response to actuation of a drive actuator 148. See, U.S. Pat. No. 8,371,909 for additional description of exemplary components of an exemplary rerucker/derucker configuration, the contents of which are hereby incorporated by reference as if recited in full herein.

The foregoing is illustrative of the present invention and is not to be construed as limiting thereof. Although a few exemplary embodiments of this invention have been described, those skilled in the art will readily appreciate that many modifications are possible in the exemplary embodiments without materially departing from the novel teachings and advantages of this invention. Accordingly, all such modifications are intended to be included within the scope of this invention as defined in the claims. In the claims, means-plus-function clauses, where used, are intended to cover the structures described herein as performing the recited function and not only structural equivalents but also equivalent structures. Therefore, it is to be understood that the foregoing is illustrative of the present invention and is not to be construed as limited to the specific embodiments disclosed, and that modifications to the disclosed embodiments, as well as other embodiments, are intended to be included within the scope of the appended claims. The invention is defined by the following claims, with equivalents of the claims to be included therein.

That which is claimed is:

1. A rucker, rerucker, derucker or skin break gripper comprising:
    a plurality of abutting planar gripper layers, each with a perimeter having a front facing semi-circular side with a plurality of spaced apart arcuate shaped teeth with adjacent teeth separated by a valley of a width narrower than the width of the adjacent teeth, and
    wherein neighboring gripper layers are arranged so that at least some teeth in a first neighboring gripper layer are misaligned to be offset from underlying or overlying or underlying and overlying teeth in a second neighboring gripper layer.

2. The gripper of claim 1, wherein the plurality of abutting planar gripper layers is a plurality of planar semi-rigid gripper layers stacked together with the teeth facing inward.

3. The gripper of claim 2, wherein the stacked layers are arranged so that teeth and valleys serially repeat over the semi-circular side, and wherein teeth in one layer are misaligned with teeth in at least one abutting layer.

4. The gripper of claim 1, wherein the plurality of abutting planar gripper layers is a set of between 2-10 cooperating stacked planar gripper layers.

5. The gripper of claim 1, wherein the gripper layer has a monolithic polymeric and/or elastomeric body, and wherein the gripper layer is semi-rigid and has a thickness between about 0.125 inches to about 0.5 inches with between about 10-20 teeth.

6. The gripper of claim 1, wherein the teeth have a discontinuous arcuate outer edge.

7. A rucker, rerucker, derucker or skin break gripper comprising:
    a plurality of abutting planar gripper layers, each with a perimeter having a front facing semi-circular side with a series of spaced apart teeth extending along the perimeter, including intermediate the ends of the semi-circular perimeter;
    wherein the series of teeth are arcuate in shape to present a series of gripping locations along the perimeter, the teeth spaced apart by valleys, the valleys having a width narrower than the width of the arcuate shaped teeth.

8. The gripper of claim 7, wherein the teeth have a discontinuous arcuate outer edge.

9. A gripper assembly, comprising:
    a stacked set of cooperating gripper layers having a perimeter with a forward facing semi-circular profile with a series of arcuate shaped teeth facing inward and positioned along the perimeter to present a series of gripping locations along the perimeter wall, including intermediate the ends of the semi-circular perimeter, and
    wherein each layer is configured so a respective front facing semi-circular profile comprises valleys, with a respective valley separating at least some adjacent teeth, the valley of a width that is narrower than the width of the arcuate shaped teeth.

10. The gripper assembly of claim 9, further comprising a housing holding the stacked set of gripper layers and a bracket attached to the housing configured to attach to an actuation cylinder.

11. The gripper assembly of claim 10, wherein the housing includes at least one laterally extending channel that is configured to cooperate with a rail to allow the gripper assembly to controllably reciprocate in response to actuation of the actuation cylinder.

12. The gripper assembly of claim 9, further comprising a housing holding the stacked set of gripper layers, the housing having a curved forward facing side and a primary surface with a recess having a perimeter shape sized and configured to receive the stacked set of gripper layers.

13. The gripper assembly of claim 9, wherein the teeth are round teeth, and wherein the semi-circular profile is sized to correspond to a semi-circular outer wall of a chute or horn having a diameter between about 3 inches and about 8 inches.

14. The gripper assembly of claim 9, wherein the stacked layers are arranged so that teeth and valleys serially repeat over the semi-circular profile, and wherein teeth in one layer are misaligned with teeth in at least one abutting layer, and wherein the gripper layers have a respective monolithic polymeric and/or elastomeric semi-rigid body with a thickness between about 0.125 inches to about 0.5 inches, and wherein at least some of the gripper layers have between about 10-20 teeth.

15. The gripper assembly of claim 9, wherein the teeth have a discontinuous arcuate outer edge.

16. A gripper assembly, comprising:
    a stacked set of cooperating gripper layers arranged as a plurality of abutting planar gripper layers each having a perimeter with a forward facing semi-circular profile with a series of arcuate shaped teeth, the arcuate shaped teeth separated by a valley of a width narrower than the width of the teeth; and
    wherein neighboring gripper layers are arranged so that at least some teeth in a first neighboring gripper layer are misaligned to be offset from teeth in a second neighboring gripper layer so that one row of the layers is configured with teeth and valley in alternating layers.

17. The gripper assembly of claim 16, wherein the teeth have a discontinuous arcuate outer edge.

18. A set of cooperating gripper assemblies, comprising:
    first and second cooperating gripper assemblies, each gripper assembly comprising a stacked set of cooperating gripper layers having a perimeter with a forward facing semi-circular profile with a plurality of teeth, the first gripper assembly oriented so that the forward facing semi-circular profile faces the second gripper assembly forward facing profile to substantially form a circle when the gripper assemblies are in a closed configuration residing adjacent each other, wherein the first and second cooperating gripper assemblies are configured to close against an outer wall of a horn or chute to contact covering material held thereon;
    wherein the teeth are arcuate in shape and the teeth are separated from each other along the gripper layer by a valley of a width narrower than the width of the teeth;
    wherein the semi-circular profile is sized to correspond to a semi-circular outer wall of the chute or horn having a diameter between about 3 inches and about 8 inches; and wherein the stacked set of cooperating gripper layers is arranged as a plurality of abutting planar gripper layers, wherein the stacked layers are arranged so that teeth and valleys serially repeat over the semi-circular profile, and wherein teeth in one layer are misaligned with teeth in at least one abutting layer.

19. An apparatus for rucking, derucking, rerucking and/or braking covering material from or onto a chute body, comprising:

a frame;

a gripper assembly comprising first and second cooperating gripper subassemblies each having a perimeter with one side having a semi-circular shape, wherein the side having the semi-circular shape comprises a set of stacked planar gripper layers, at least some of the layers having a series of spaced apart arcuately-shaped teeth spaced along the perimeter to provide a series of locations for gripping the covering materials, including intermediate the ends of the semi-circular perimeter, the arcuately-shaped teeth separated by a valley that is narrower than the width of the arcuately-shaped teeth; and at least one actuator attached to the gripper assembly and in communication with a controller, wherein the first and second gripper assemblies have an automated stroke cycle whereby each is configured to travel inwardly a distance sufficient to snugly abut an outer surface of a chute or horn body and remain in contact with the chute or horn body to pull covering material or brake the covering material.

20. The apparatus of claim 19, wherein the first and second gripper subassemblies each include a respective a housing that includes at least one laterally extending channel that is configured to cooperate with a rail to allow the respective gripper subassembly to controllably reciprocate in response to actuation of the actuator, and wherein the housing has a curved forward facing side and a primary surface with a recess having a perimeter shape sized and configured to receive the stacked set of gripper layers.

* * * * *